United States Patent [19]
Kenton et al.

[11] Patent Number: 5,464,479
[45] Date of Patent: Nov. 7, 1995

[54] METHOD FOR REMOVING UNDESIRED MATERIAL FROM INTERNAL SPACES OF PARTS

[76] Inventors: Donald J. Kenton, 2625 Pebble Valley, San Antonio, Tex. 78232; Frank Laughlin, 4007 Hollow Oak Dr., Euless, Tex. 76040; Charles McComas, 2204 SW. Schoal Creek Trace, Palm City, Fla. 34990

[21] Appl. No.: 298,790

[22] Filed: Aug. 31, 1994

[51] Int. Cl.⁶ .............................. B08B 3/02; B08B 3/04; B08B 5/02; B08B 9/00
[52] U.S. Cl. .................... 134/1; 134/4; 134/13; 134/22.1; 134/42
[58] Field of Search .................. 134/1, 4, 22.1, 134/13, 20, 42

[56] References Cited

U.S. PATENT DOCUMENTS

| | | | |
|---|---|---|---|
| 3,419,427 | 12/1968 | Plock | 134/4 |
| 4,409,034 | 10/1983 | Williams | 134/4 |
| 4,491,484 | 1/1985 | Williams | 134/4 |
| 4,589,203 | 5/1986 | Le Diouron | 29/829 |
| 4,692,982 | 9/1987 | Rice | 29/402.09 |
| 4,940,494 | 7/1990 | Petit et al. | 134/1 |
| 5,025,632 | 6/1991 | Spritzer | 62/64 |
| 5,091,034 | 2/1992 | Hubert | 156/344 |

*Primary Examiner*—Jan H. Silbaugh
*Assistant Examiner*—Zeinab El-Arini
*Attorney, Agent, or Firm*—Gunn, Lee & Miller

[57] ABSTRACT

A method and apparatus for removing undesired material from the internal spaces of parts and more particularly, air cooled gas turbine engine blades. The cleaning method employs a series of an immersion in water to saturate at least a portion of the material, an immersion in a liquid which will freeze the water remaining in the material and on the part or blade directly adjacent to the material and a pressure flush to remove the loosened material from the internal spaces.

20 Claims, 4 Drawing Sheets

METHOD FOR REMOVING UNDESIRED MATERIAL FROM INTERNAL SPACES OF PARTS

BACKGROUND OF THE INVENTION

1. Field of the Invention

The present invention relates generally to a method and apparatus for removing undesired material from internal spaces. More particularly, this invention relates to a method and apparatus for removing undesired material formed in internal spaces of a part from elevated temperature reactions between impurities in air passing through these internal spaces. Specifically, this invention relates to removing undesired material from the internal spaces of air cooled gas turbine engine blades.

2. Description of the Prior Art

Many mechanical parts which are utilized in the aircraft industry are subjected to extreme conditions in regard to temperature and speed. The mechanical parts of a modern gas turbine engine are designed to obtain maximum efficiency from the engine.

A typical gas turbine engine contains a series of turbine rotors containing blades. For example, a typical turbine assembly for a dual compressor turbofan engine contains four stages of turbine rotors and blades.

Turbines are subjected to both high speeds and high temperatures. High speeds result in high centrifugal forces and, because of high temperatures, turbines must operate close to temperature limits which, if exceeded, lower the strength of the construction materials used in the turbines. Because the limiting factor in most turbine engine design is the maximum temperature that can be tolerated at the turbine inlet, engine design engineers have used every device at their command to increase the allowable inlet temperature. Typically, turbine inlet temperatures of advanced engines exceed the thermal limits of the turbine blades and vanes used to extract useful work from the working gas. Designers have overcome this limitation by recognizing that excess air flows in the compressor section of gas turbines. A small portion of the relatively cool compressor air is directed around the combustion chamber into the turbine components by means of ducts and channels. This air extracts heat from the working turbine gases and keeps the components at safe operating temperatures.

On many large engines, turbine inlet guide vanes and the rotor blades are cooled by conducting compressor "bleed air" through passages inside the engine to the turbine area where the air, which acts as a coolant, is led to longitudinal holes, tubes, passages or cavities in the first stage and second stage vanes and blades.

In the simplest cooling method, this so called "bleed air" is directed through a cavity or longitudinal holes machined or cast into the turbine part. Air enters at the blade root and exits at the tip. A more complicated method of component cooling consists of incorporating serpentine (winding) passages into the component. These passages increase the surface area of the part in contact with the cooling gas, thereby allows the cooling gas to extract more heat. Air enters at the base of the blade, travels through the passages, and returns to exit at the base. A further embodiment of the serpentine cooling passage scheme incorporates exit holes at tip, leading edge, and trailing edge locations, as determined by design calculation and tests, to force cooler air over the external part surface. Although the "bleed air" coming from the compressor may be hot, it is cool in relation to the temperature at the turbine inlet. The air, therefore, serves to cool the vanes and blades, thus permitting the gases coming from the burner section of the engine to enter the turbine at a higher temperature than would otherwise be permissible. Generally, cooling is necessary only in the area of the turbine inlet because enough energy is extracted from the exhaust gases by the first or second stage blades of the turbine to reduce the temperature of the gases to a tolerable level.

All cooling schemes suffer a loss of efficiency if the cooling air contains small particulate matter which becomes trapped in the cooling passages. This matter is a complex aluminosilicate that is formed from elevated temperature reactions between impurities and the bypass cooling air as it is swept into the leading and trailing edge corners of these hollow blades. Under extreme conditions, this undesired material may build up to completely block the air flow and this blockage can result in destruction of the blade and extensive engine damage. More typically, the contaminating particulates accumulate in dead zones, or pockets, within the cooling passage partially blocking flow. If this contaminating matter is not removed at time of overhaul, it can react with the base metal of the blade and cause catastrophic loss of strength.

Current procedures for cleaning the internal passages of the hollow blades involve immersing the blades in a 45% solution of potassium hydroxide at 400° Fahrenheit under 200 psig for 24 hours with agitation. The blades are then flushed under pressure, both internally and externally, and boiled in distilled water. The blades are then checked for residual salts with a conductivity water check and air dried. Even though this procedure uses numerous flushes to eliminate the potassium hydroxide and a conductivity check, this procedure still leaves harmful residue in the passages which can damage the blade and lead to engine failure. Thus, there is a need in the airplane industry to find a noncorrosive method of removing and clearing out the undesired material which is deposited in the internal spaces of air cooled turbine engine blades while these blades are in use in the engine.

The present invention satisfies this need by providing an improved method and apparatus for performing this method, which removes the undesired material from the internal spaces, such as, passages or cavities of the turbine blades and does not leave a harmful residue. Thus, the present invention provides a method for cleaning internal spaces of air cooled blades, which does not expose the blades to harsh corrosive conditions which can contribute to blade and ultimately engine failure.

SUMMARY OF THE INVENTION

The present invention provides a noncorrosive method for removing undesired material formed from elevated temperature reactions between impurities in air passing through the internal spaces of a part.

The present invention provides a noncorrosive method for removing undesired material from the internal spaces, such as, passages or cavities, of air-cooled turbine engine blades.

The present invention provides an apparatus for use in the method of removing undesired material from the internal spaces, such as, passages or cavities of parts or air cooled turbine blades.

The present invention provides an improved method for removing the undesired material which blocks and/or contaminates the internal spaces of parts; such as, air cooled turbine blades.

It is believed that the improved method works by a combination of the expansion of water in or directly adjacent to the undesired material when it freezes coupled with a thermal contraction of the part or blade when it is placed in an environment sufficiently cold to freeze the water remaining in and directly adjacent to the undesired material on the part. The method is based upon the theory of using a "mechanical" approach to reach and clean portions of the part or blade which cannot be reached by typical mechanical means or tools. The method in essence scrapes and releases the material from the spaces without using a mechanical tool to do so.

The method is applicable to remove undesirable material which contaminates surfaces and blocks internal spaces from parts made from a number of different materials, such as, metal, or metal matrix composites, but the method could be used to clean ceramic materials or organic composite materials if liquids used in the method were selected which maintained the surfaces of the materials at temperatures where these materials still had some ductility.

The method comprises a series of steps in which at least a portion of the part or blade is immersed in water for a period of time sufficient to saturate at least a portion of the undesired material which blocks and/or contaminates the internal spaces. The part or blade is removed from the water and immersed in a cold liquid which will cause the water which is still present in the material and on the part or blade directly adjacent to the undesired material to freeze. Because ice has a greater specific volume than water, the ice formed in the undesired material as well as around it, causes the undesired material to shatter through expansion. Once the material has been shattered, a pressure flush with water, air or any other substance which can be used to flush internal spaces will remove the material which has been shattered by the prior immersion steps and which is present in the internal spaces.

The apparatus by which the disclosed method is performed consists of at least two tanks and a flushing apparatus. One tank contains water for immersing at least a portion of the part or blade to saturate at least a portion of the undesired material and the other tank contains the liquid which freezes the water from the immersion in the first tank remaining in the material and on the part or blade directly adjacent to the undesired material. The number of tanks may be more than two to expedite the processing time of the parts or blades. For example, there can be three tanks set up side by side with the liquid for freezing in the middle of the two water containing tanks. This arrangement of the tanks allows two water containing tanks to share one tank containing the liquid for freezing the water. This arrangement could be expanded to any number of groups of three tanks with each group consisting of two water containing tanks and one tank containing the liquid for freezing the water remaining in or directly adjacent to the undesired material on the part or blade.

The flushing apparatus comprises a flushing cabinet containing a pump, an accumulator, and a fixture to hold the part or blade during flushing. The pump is attached to a source of water, another liquid, air, or any substance which can be used to flush out the internal spaces of the part or blade. Hoses attach the pump to the part or blade and the pump can deliver the flushing substance such as; water, alcohol, air, or dry ice pellets under high pressure.

Generally, the method includes at least one series of the two immersions (meaning a water immersion followed by a cold liquid immersion) and one flush, which includes an immersion of at least a portion of the part or blade in warm water to saturate at least a portion of the undesired material, followed by an immersion of the part or blade in a liquid which freezes the water remaining in the material or on the part or blade directly adjacent to the undesired material and then a flushing of the internal spaces of the part or blade with sufficient pressure to cause at least some of the material which the prior immersion steps have loosened to be removed.

The method can be lengthened, if necessary, by repeating any steps or combination of steps, to remove particularly resistant undesired material with the increased number of immersions and flushes.

A determination as to whether the method should be lengthened can be made by examining the part or blade using X-ray radiography and subsequently inspecting the radiographic images of the part or blade to determine whether the undesired material has been removed. For example, to confirm that air cooled turbine engine blades have been satisfactorily cleaned, the inspection should show no shadowing in the internal spaces and the internal ribbing on the airfoil surfaces should be clearly visible.

An alternative method of removing undesired material is based upon the same principle as described above. The alternative method involves completing one series of the two immersions and a flush followed by an immersion of the part or blade in the liquid cold enough to freeze the water remaining as a result of the flushing step, in the material and on the part or blade directly adjacent to the material. This cold immersion is followed by a flush to remove any shattered undesired material from the part or blade. The cold immersion and flush is repeated for at least one more time but may be repeated for an additional three to twelve times. Thus, the combination of the cold immersion and flush steps can be performed for a number of times sufficient to remove the undesired material from the internal spaces of the part or blade.

Another alternative method of removing undesired material from the internal passages of a part or an air cooled hollow turbine blade is also based upon the same principle as described above. The alternative method involves completing one series of the two immersions and a flush followed by an immersion of at least a portion of the part or blade in water with the subsequent immersion of the part or blade in the liquid cold enough to freeze the water remaining in the material and on the part or blade directly adjacent to the material. The immersion in water followed by the immersion in the cold liquid is repeated for at least one more time but preferably may be repeated up to four times prior to flushing the internal spaces of the part or blade to remove any loosened material. After the flushing, the part or blade can again be immersed in water followed by the immersion in the cold liquid. These two immersion steps can be repeated for up to four more times. The number of times the immersion steps should be repeated should be the minimum number necessary to remove the undesired material from the internal spaces of the part or blade. After a sufficient number of series of immersions have been completed, a flush should follow. After the last flush, the part or blade is then allowed to dry, prepared for radiographic testing, examined using radiographic imaging and the radiographic images of the blades are inspected to determine whether the undesired material has been removed.

BRIEF DESCRIPTION OF THE DRAWINGS

FIG. 3a' is a partial, enlarged view of a portion of FIG. 3a.

FIG. 4a is a cross-sectional view of the internal passages of the blade of FIG. 3a.

DETAILED DESCRIPTION OF THE PREFERRED EMBODIMENT

The method of the present invention is generally applicable for the removal of undesirable material in internal spaces of a part. Specifically, the method is particularly applicable for the removal of undesirable material formed from elevated temperature reactions between impurities in air passing through internal spaces of air cooled hollow turbine engine blades.

Figure 1A:
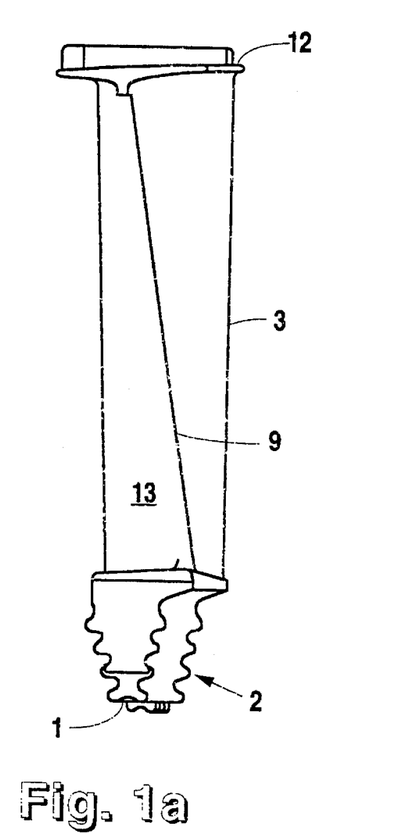
FIG. 1a is a perspective view of a JT8D first stage air cooled turbine engine blade.

FIGS. 1a–d and FIGS. 2a and 2b show different views of a JT8D air cooled turbine engine blade; that is, a first stage turbine blade from a Pratt & Whitney JT8D Engine, which can be satisfactorily cleaned by the method of the present invention. FIG. 1a shows the blade from a front view. The rivet groove (1) and the root or fir tree shaped base (2) allow the blade to be fitted into a rotating disc. The rotating disc containing all of the turbine blades makes up a turbine wheel in the engine. The number of blades present on a rotating disc depends upon the engine type and manufacturer. Generally, a turbine wheel contains 64 or 80 turbine blades. The blade consists of a trailing edge (3), a leading edge (9), a root center plane (13) and a shroud (12).

Figure 1B:
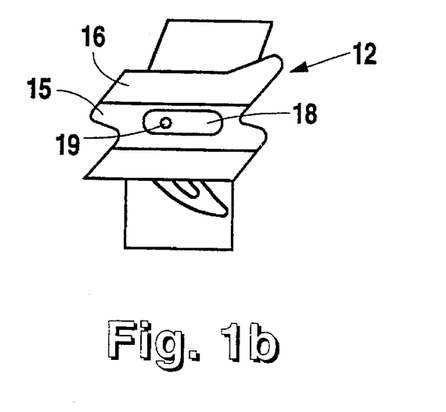
FIG. 1b is a top view of a JT8D first stage air cooled turbine engine blade.

FIG. 1b shows a top view of the shroud. The shroud (12) consists of a spoiler (15), an airfoil convex surface (16) and an oblong depression (18) in the spoiler which contains a tip hole (19) into the interior of the blade. The tip hole (19) is present to allow air to be sucked out of the blade and to help keep the tip of the blade cool.

Figure 1C:
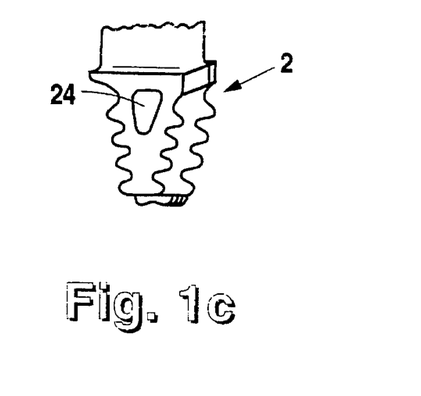
FIG. 1c is a rear view of the fir-tree root of a JT8D first stage air cooled turbine engine blade.
Figure 1D:
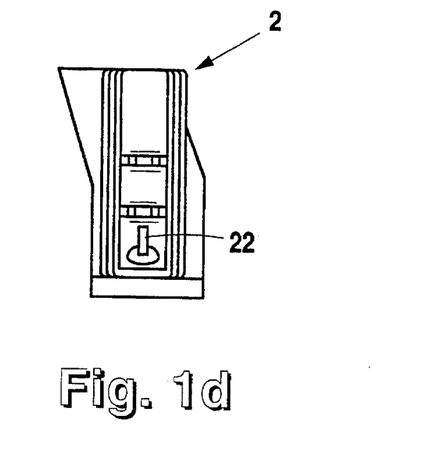
FIG. 1d is a bottom view of the fir-tree root of a JT8D first stage air cooled turbine engine blade.

FIG. 1c shows a rear view of the fir-tree shaped root and FIG. 1d shows a bottom view of the fir-tree shaped root. The gases and air flow into the bottom of the blade through an inlet hole (22) on the bottom of the fir-tree shaped root (2), through the internal passages and out through an exit hole (24) on the fir-tree shaped root on the back side of the blade and out the tip hole (19) on the top of the blade.

Figure 2A:
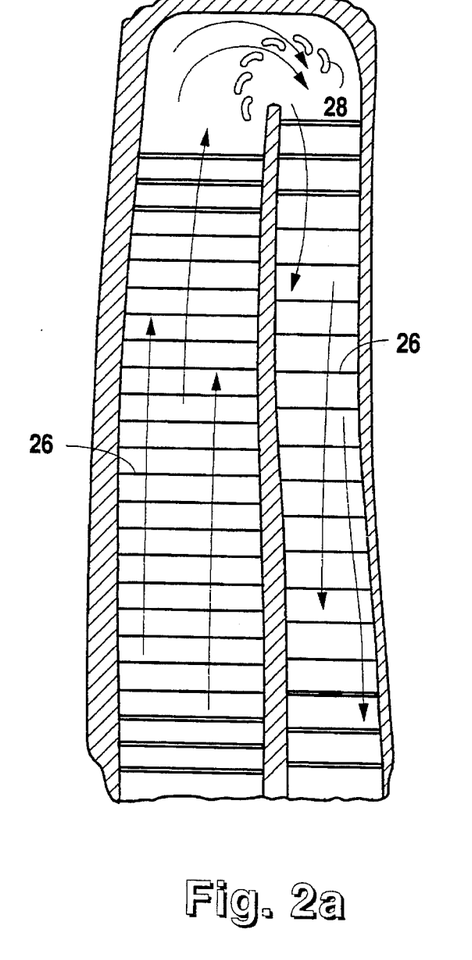
FIG. 2a is a cross-sectional view of the interior of a JT8D first stage air cooled turbine engine blade.
Figure 2B:
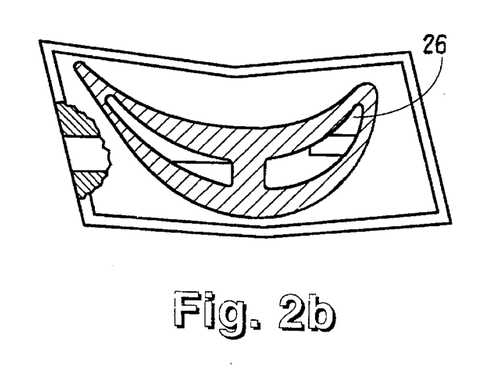
FIG. 2b is a top cross-sectional view of the interior of a JT8D first stage air cooled turbine engine blade.

FIG. 2a shows the interior of the blade shown in FIG. 1a depicting the internal passages (26) through which gases and air flow. Air flow through the passages is shown by the arrows. The air flows into the blade at the inlet hole (22) of the root, through the passages and around the airflow guides (28) which is where the undesired particulate material is predominately deposited, but it can also be deposited throughout the internal passages of the blade. FIG. 2b shows a top view of these internal passages.

Figure 3A:
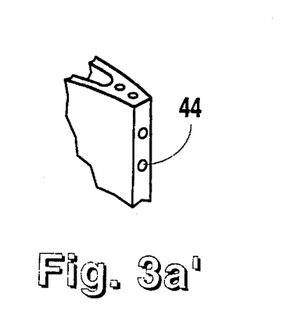
FIG. 3a is a perspective view of a TF39 HPT first stage air cooled turbine engine blade.
Figure 3B:
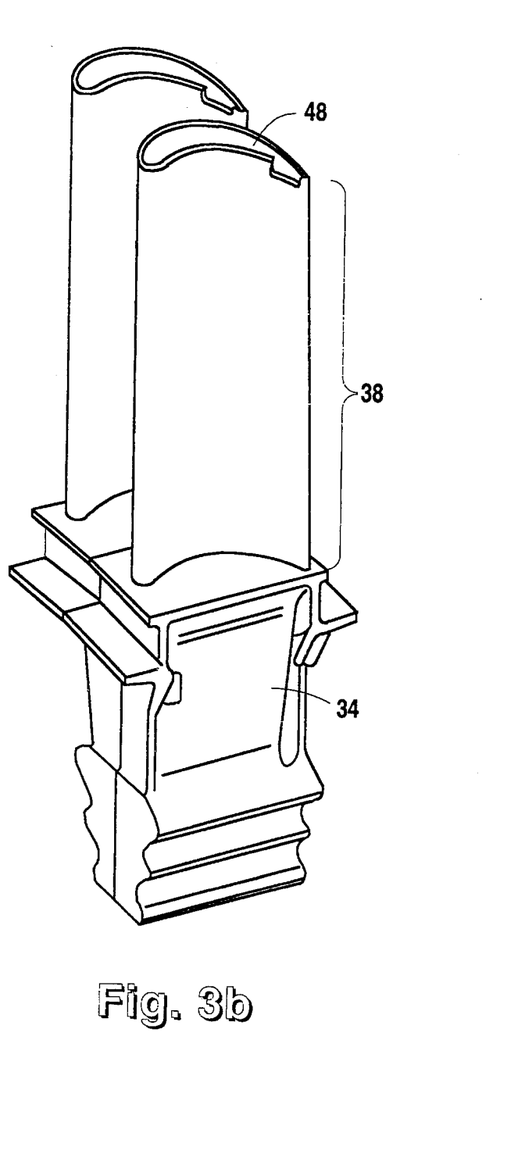
FIG. 3b is a perspective view of a TF39 HPT second stage air cooled turbine engine blade.

FIGS. 3a, 3a', and 3b show other examples of air cooled turbine engine blades, TF39 HPT blades, which can be cleaned by the method of the present invention. FIG. 3a shows a first stage blade and FIG. 3b shows a second stage blade. The two types of blades have identical blade shanks (32) and (34), but the upper portion of the blades (36) and (38) differ in that the first stage blade of FIG. 3a has nose holes (40) and gill holes (42) along the leading edge and trailing edge holes (44), as shown in FIG. 3a'; whereas the second stage blade of FIG. 3b does not have these holes. Both stages of blades have tip cap holes (46) and (48).

Figure 4A:
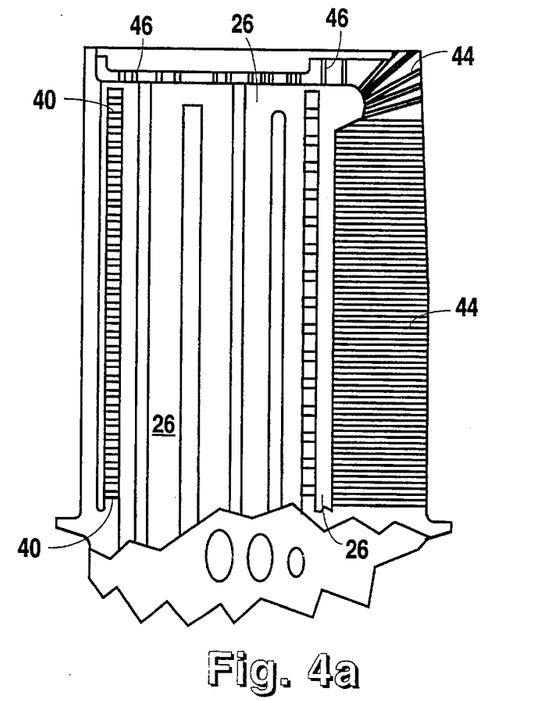
Figure 4B:
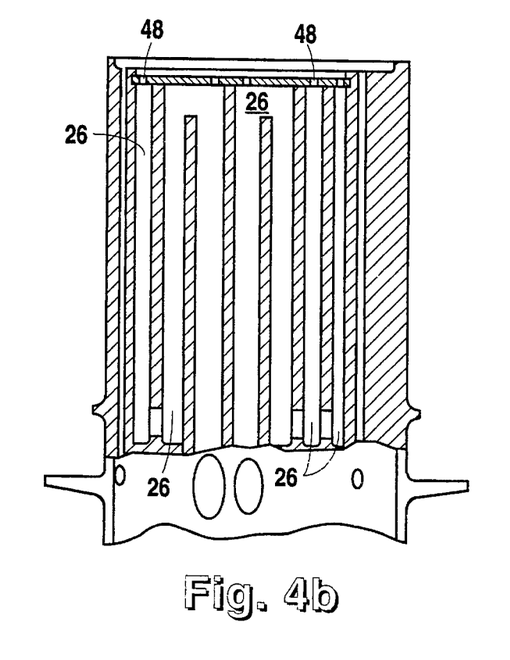
FIG. 4b is a cross-sectional view of the internal passages of the blade of FIG. 3b.

FIG. 4a shows a cross-sectional view of the internal passages (26) of the TF39 HPT blade shown in FIG. 3a and FIG. 4b shows a cross-sectional view of the internal passages (26) of the TF39 HPT blade shown in FIG. 3b. The internal view and designatiton of the various holes of these blades can be seen in FIGS. 4a and 4b. These types of blades have the serpentine passages and as with the JT8D blades, the air flows in the base, through the passages, and exits through the base. As the air flows through the passages, the undesired particulate material is laid down.

Prior to beginning the cleaning method of the present invention, a number of preliminary steps may be performed. Whether these steps are performed depends upon the blade configuration and the extent of obvious external gross undesirable material as viewed by the person performing the cleaning method.

After the blade is received for cleaning, it is inspected and stamped for identification in a non-critical area. Depending upon the configuration of the blade, the root sealant is removed. This removal is performed by a glass bead blast by using 80 grit glass beads at 60–80 psig for 15 seconds. Alternatively, the root sealant can be removed by chemical stripping with nitric acid. The airfoil and root section except for the root sealant are masked using an acid resistant, temporary masking material. The blade is then immersed in 50% nitric acid at room temperature for 1 minute and rinsed with water. If the blade does not contain any dark smut then the stripping is complete. The blade is then immersed in a 10–30% sodium hydroxide solution for 15–30 seconds and rinsed with water. The masking material is then removed. If dark smut is observed after the nitric acid step then the nitric acid step is repeated until no dark smut is observed.

If the blades contain a metering plate, such as, the 15A and 17A blades from Pratt & Whitney JT8D ST1 (Stage 1) turbine engines, then the metering plates must be removed. To remove the metering plate, a fixture is loaded into a grinder bed and the blade is loaded into the fixture. The blade is supported at both the shroud and the root on the surface grinder and the metering plate is carefully removed by conventional grinding without damaging the base metal.

If it appears that the tip hole is blocked, a piano wire of suitable size to enter the tip hole (19) mounted on a hand-held linear stroke polishing machine is used to probe the tip hole (19) to loosen any undesirable blocking material. Care must be taken in this step to avoid scraping or touching the internally coated surfaces of the blade. The NSK Elector GX is an example of a vibratory device with a linear motion which can be used for inserting a wire into the tip hole (19). The probing of the tip hole (19) can optionally be performed under pressure, such as negative pressure. If negative pressure is used, the blade is mounted into a rubber boot with the root section oriented down on an evacuation stand. Negative pressure is applied to the blade through both the inlet and exit holes but not until the vacuum reaches 23 inches Mercury. While the blade is under negative pressure, a piano wire is used as described above. Probing of the tip hole (19) is continued until suction is felt at the tip hole (19) and the exit hole.

If it appears that the external surface of the blade contains a significant amount of dirt and contamination, then the blade should be immersed in an alkaline cleaning solution with the root section oriented up for 30–90 minutes at 180°–200° Fahrenheit. The alkaline cleaning solution should be one approved by manufacturers of turbine components. Eldorado HTP1150, available from Eldorado Chemical Company, Inc. of San Antonio, Tex., in dry form, is an example of such a solution and it contains sodium hydroxide and proprietary cleaning agents. This solution can be prepared according to the manufacturer's directions. The blade is removed from this solution and immediately rinsed with water at 50 to 100 psig. The blade is then soaked for 1 hour in hot water at 180°–200° Fahrenheit. The blade is removed from the hot water soak and washed with water at 50–100 psig for 3–7 minutes.

All of the steps to this point are optional or dependent upon the configuration of the blade and the extent of external gross contamination. The method of the present invention has been designed to clean the undesirable material from the internal spaces of the air cooled hollow turbine blades.

The method in its broadest sense contains the steps of (a) immersing at least a portion of the blade into a first tank containing water at a temperature and for a period of time sufficient to saturate at least a portion of the undesirable material; (b) removing the blade from the first tank and immersing the blade into a second tank containing a cold liquid at a temperature and for a period of time sufficient to allow the water remaining in the material and on the blade directly adjacent to the material to freeze; and (c) removing the blade from the second tank and flushing the internal spaces of the blade with sufficient pressure to cause at least some of the material which the immersion steps have loosened to be removed.

The first step of the method involves immersing the blade with its root section oriented down into a tank containing water. The purpose of this step is to saturate at least a portion of the undesirable material present in the internal spaces of the blade. Once this first step of the claimed method is performed, it is important that water remains in the internal passages and thus, the blade must not be allowed to dry until the final flush of the method is completed. The temperature of this water in the first tank can be any temperature above the freezing temperature of water (32° Fahrenheit). However, it is believed that warm water in the first tank will expedite the saturation of the undesirable material in the internal spaces of the blade. Therefore, it is preferred that the temperature of the water in the first tank should be between approximately 100° to 190° Fahrenheit and preferably the temperature of the water in the first tank should be between approximately 170° to 190° Fahrenheit.

To further expedite the process of saturating the undesirable material the water in the first tank can optionally contain a surfactant. Any surfactant can be utilized, such as, an anionic surfactant, for example, sodium lauryl sulfate. A preferred surfactant is the active ingredient in a commercially available cleaning solution, MR. CLEAN manufactured by Proctor & Gamble, Cincinnati, Ohio. A preferred solution is two ounces of MR. CLEAN per one gallon of water.

To further expedite the process of saturating the undesirable material the first tank can optionally possess the capability of generating ultrasonic waves in the water in the first tank so that the first step of the method can optionally include an additional step of sonicating the blade while it is immersed in the first tank. A preferred sonication set up is a submerged sonicator which is attached to a side wall of the tank. Preferably, the sonication settings should be 40 kilohertz at approximately 4 watts per square inch.

The blade is immersed in the first tank for at least 10 minutes and up to approximately 35 minutes. It is preferred that for the first immersion of the method the blade be immersed for at least 25 minutes. If more than one immersion in water is required to remove the undesired material, the immersion time of these subsequent immersions can be shortened but should be at least 10 minutes in length.

It is believed that all that is necessary in the first immersion in the tank containing water is to saturate at least a portion of the undesired material with water. The optional and preferred features, such as, sonication, addition of a surfactant, specific temperatures and specific duration of steps in the method are considered as various means of expediting the process of saturating at least a portion of the undesired material but are considered optional and not critical for the saturation to occur.

After the first immersion in the tank containing water, the blade is removed and immediately immersed in a second tank containing a cold liquid which freezes the water present in the material and on the blade directly adjacent to the material. The temperature of the cold liquid in the second tank should be between approximately −320° to 20° Fahrenheit. The preferred temperature is between approximately −320° to 80° Fahrenheit. The lower temperature of the cold liquid is believed to expedite freezing of the water in and directly adjacent to the undesired material.

The cold liquid, preferably is liquid nitrogen, liquid carbon dioxide, liquid argon, or liquid helium. The blade should be immersed in the cold liquid for at least 2 minutes when the temperature of the cold liquid is at least −20° Fahrenheit. The immersion in the cold liquid can be for approximately between 2 to 5 minutes.

The blade is removed from the second tank containing the cold liquid and is placed in a flushing cabinet. Optionally, the blade can be placed in the first tank for approximately 30 seconds to prevent frost buildup on the root section. If the blade is removed from the second tank and not immediately flushed, the blade should be stored in a container filled with water so that the internal spaces of the blade will not dry out. The first tank containing water could be used as the storage container.

The flushing step involves attaching the blade to a fixture which is mounted in the flushing cabinet. The high pressure flush system comprises a cabinet, a central pump, a water source (either city water or a 20 to 50 gallon reservoir), a small (1 quart) accumulator, a shuttle valve assembly, and attachment hoses between the accumulator and shuttle valve, and the part holding fixture. The accumulator is equipped with a shutoff valve actuated by high and low pressure level switches. An appropriate holding fixture is placed within the high pressure flush cabinet. The attachment hoses extend from the shuttle valve through cabinet wall fittings and connect to disconnects provided on the part holding fixture. The fixture, in turn, is designated to direct water from the hoses into the cooling passage openings in the root section of the blade. This is accomplished by actually connecting the hoses through the shuttle valve to a blade root holder which has cavities machined within that align with the part's cooling slots. The clamps are lined with rubber gaskets to minimize water leakage.

After the part is loaded into the fixture, the water system is energized. Water is pumped into the accumulator up to a preset pressure established at the accumulator shut off valve. When this pressure is reached, the accumulator valve opens allowing water to discharge as a burst until the lower pressure set point is reached shutting off the valve. This occurs in about ¾–1 second. The water pulse is directed through the shuttle valve and into the blade. As the pressure level of the water burst into the blade decreases to zero net pressure, a solenoid switch on the shuttle valve is actuated shifting the position of the shuttle valve to reverse the flow direction through the valve and into the part. This motion matches the actuation of the accumulator valve. Each pulse triggers a shift in the flow direction allowed by the shuttle valve. In this manner high pressure bursts at the rate of approximately one each second are directed through the blade.

This same principle can be used with any system. Generally, high pressure rinsing or cleaning is conducted using water or fluids of similar density to maximize the amount of kinetic energy available per unit volume of fluid while keeping equipment costs within economic bounds.

The water may also be flushed through the blade in a continuous flush. When the flushing is a pulsating flush, it is performed at least 3 times and up to 6 times in each direction through the internal passages of the blade on an alternating basis. This flushing step is performed at a pressure of at least 500 psig. Higher pressure may be used, such as 3500–4500 psig.

After the flushing step is completed, the blades can be dried at room temperature but the drying step can optionally be performed in an oven at a temperature of approximately between 230° to 270° Fahrenheit for a period of time approximately between 45 and 90 minutes if faster drying is required.

After drying the blade, it can optionally be attached to a vacuum by again mounting the blade into a rubber boot with the root section oriented down on an evacuation stand. Negative pressure is applied to the blade through both the inlet and exit holes but not until the vacuum reaches 23 inches Mercury.

After the blade is dried, it is prepared for x-ray radiography. The blade can be x-rayed without any special preparation, but it is preferred that the blade be filled with a shot or a powder while the blade is vibrated to enhance the contrast between contaminated and clear areas. The use of powder is preferable and the preferable powder is tungsten carbide cobalt powder. After the blade is filled with the powder, the inlet and exit holes of the blade are then covered with tape. The blades are tested by taking radiographic images using a minimum of one orientation of the blade shroud section. The radiographic images are reviewed to ensure that the internal spaces are clear of undesired material. After the radiographic images have been taken, the tape covering the inlet and exit holes is removed. The blade is placed on a vibrating table root section oriented down to remove the powder. The vacuum step as described above can optionally be used in this step in the method to aid in removing the powder from the internal spaces of the blade.

The radiographic images must show clear passages with no shadowing. The shadowing represents the presence of undesired material. The internal ribbing on the airfoil surfaces should be clearly visible. An examination of these radiographic images provides a way to determine the extent to which the method of the present invention has cleaned the undesired material from the internal spaces of air cooled hollow turbine blades.

Alternatively, the steps in the method described above can be modified to obtain clean air cooled hollow turbine blades. As a result of particularly blocked or contaminated internal spaces, some of the steps of the method may need to be repeated one or more times. Further, some steps may need to be repeated several times in series with some steps only being repeated once after a series of repeated steps.

For example, one such alternative method in accordance with the present invention for removing undesired material in internal spaces of a part or blade includes the steps of (a) immersing at least a portion of the part or blade into a first tank containing water at a temperature and for a period of time sufficient to saturate at least a portion of the undesired material; (b) removing the part or blade from the first tank of step (a) and immersing the part or blade into a second tank containing a cold liquid at a temperature and for a period of time sufficient to allow the water remaining in the material and on the part or blade directly adjacent to the material to freeze; (c) removing the part or blade from the second tank and flushing the internal spaces of the part or blade with sufficient pressure to cause at least some of the material loosened by the prior steps to be removed; (d) taking the part or blade after completion of step (c) and repeating steps (a) and (b) consecutively for at least one time; (e) taking the part or blade after completion of step (d) and repeating step (c); (f) repeating steps (d) and (e) for a minimum number of times sufficient to remove the undesired material from the internal spaces of the part or blade.

After the first series of an immersion in water, an immersion in a cold liquid and flushing, the immersions are repeated for at least one more time but this series of immersions can be repeated preferably for as many as four times before a flushing step is used.

This method uses all of the particular features and embodiments of the methods described above in regard to optional and preferred embodiments, such as, the addition of sonication, the presence of a surfactant, ranges of temperature and time of particular steps, type of cold liquid, type of flush, and pressure of flush. One of the exceptions is that after the first immersion in water for a period of time of between approximately 25 and 35 minutes; that is, preferably approximately 30 minutes, the period of time for the subsequent immersions in water are for approximately only 10 minutes. Further, if the part is an air cooled turbine blade, the blade root is oriented up in the first immersion in water. The blade root is oriented down in the next immersion in water but the blade remains in this orientation for a series of immersions in water and immersions in the cold liquid. Only after the blade is flushed is the orientation of the blade changed. This change in orientation of the blade will continue until the last immersion in water has been performed.

An example of the preferred method of the present invention involves a method for removing undesired material from the internal spaces of an air cooled turbine engine blade comprising the steps of (a) immersing at least a portion of the blade into a first tank containing water at a temperature and for a period of time sufficient to saturate at least a portion of the undesirable material; (b) removing the blade from the first tank and immersing the blade into a second tank containing a cold liquid at a temperature and for a period of time sufficient to allow the water remaining in the material or on the blade directly adjacent to the material on the blade to freeze; (c) removing the blade from the second tank and flushing the internal spaces of the blade with high pressure water sufficient to cause at least some of the material loosened by the prior steps to be removed; (d) taking the blade after completion of step (c) and repeating steps (a) and (b) consecutively for at least four times; (e) taking the blade after completion of step (d) and repeating step (c); (f) taking the blade after completion of step (e) and repeating steps (a) and (b) consecutively for at least four times; (g) taking the blade after completion of step (f) and repeating step (c); (h) taking the blade after completion of step (g) and repeating steps (a) and (b) consecutively for at least four times; (i) taking the blade after completion of step (h) and repeating step (c).

In summary, this preferred method includes one series of an immersion in water, an immersion in a cold liquid to freeze the remaining water and a high pressure water flush; then a series of a water immersion followed by a cold immersion for at least four times is followed by a high pressure water flush; then another series of a water immersion followed by a cold immersion for at least four times is followed by a high pressure water flush; then a final series of a water immersion followed by a cold immersion for at least four times is followed by a high pressure water flush.

This method also uses all of the particular features and embodiments of the methods described above in regard to optional and preferred embodiments, such as the addition of sonication, the presence of a surfactant, ranges of temperature and time of particular steps, type of cold liquid, type of flush and pressure of flush. One of the exceptions is that after the first immersion in water for a period of time of between approximately 25 and 35 minutes; that is, preferably approximately 30 minutes, the period of time for the subsequent immersions in water are for approximately only 10 minutes. Additionally in the first immersion in water the blade root is oriented up. The blade root is oriented down in the next immersion in water but the blade remains in this orientation for the series of immersions in water and immersions in the cold liquid. Only after the blade is flushed with high pressure water is the orientation of the blade changed. This change in orientation of the blade will continue until the last immersion in water has been performed.

Another such alternative method for removing undesired material formed from elevated temperature reactions between impurities in air passing through the internal spaces of a part, such as an air cooled hollow turbine blade includes the steps of (a) immersing at least a portion of the part or blade into a first tank containing water at a temperature and for a period of time sufficient to saturate at least a portion of the undesired material; (b) removing the part or blade from the first tank and immersing the part or blade into a second tank containing a cold liquid at a temperature and for a period of time sufficient to allow the water remaining in the material and on the part or blade directly adjacent to the material on the part or blade to freeze; (c) removing the part or blade from the second tank and flushing the internal spaces of the part or blade with high pressure water with sufficient pressure to cause at least some of the material loosened by the prior steps to be removed.

The presently described alternative method additionally includes the step of (d) taking the part or blade after completion of step (c) and repeating step (b) which is immersion of the part or blade in a cold liquid to freeze the water remaining in the material and on the part or blade directly adjacent to the material followed by step (c) which is flushing the internal spaces with high pressure water to remove the loosened material. These two steps, (b) and (c), are repeated consecutively for at least one time but may be repeated for from two to twelve times prior to completion of the process depending upon the extent of the presence of the undesired material on the part or blade as determined by x-ray images of the internal cavities.

After the first series of an immersion in water, an immersion in cold liquid and flushing with high pressure water, the combination of immersion in cold liquid followed by the flushing is repeated until the internal spaces of the part or blade are clean. This method uses the high pressure water flush to introduce water into the internal spaces of the part or blade to saturate at least a portion of the undesired material and thus eliminates the water immersion step after the first one.

This method uses all of the particular features and embodiments of the method described above in regard to optional and preferred embodiments, such as the addition of sonication, the presence of a surfactant, ranges of temperature and time of particular steps, type of cold liquid, type of flush, and pressure of flush.

The method for cleaning the internal spaces of parts and air cooled hollow turbine blades requires the use of a series of tanks; for example, one or two tanks containing water for immersing the blades so that the undesired material can be saturated and one tank containing a cold liquid for freezing any water remaining in the material or on the blade directly adjacent to the material in the internal spaces of the blades. After the immersion to freeze the water, the internal spaces of the blade are flushed with high pressure water with a high pressure flushing apparatus to provide an additional physical force to remove the undesired material. The method of the present invention allows for a number of parts or blades to be immersed at the same time on racks, generally the racks can accommodate between 16 and 40 blades at one time.

The high pressure flush system has been described in detail above; however, any high pressure flushing apparatus could be used if its use resulted in the removal of the loosened material in the internal passage of the part or blade.

Although methods and apparatus are disclosed for removing undesired material formed from elevated temperature reactions between impurities in air passing through the internal spaces of an air cooled hollow turbine engine blade, it is believed that the disclosed methods would be applicable for cleaning other parts made from numerous materials, which may be contaminated with material which is hard to remove and which is located in a hard to reach area of the part or blade.

While the above invention has been described in the presently preferred embodiments, it will be apparent to those of ordinary skill in the art that many modifications may be made to the methods and to the apparatus which do not depart from the spirit of the invention and are still considered to be within the scope of the invention herein disclosed.

We claim:

1. A method for removing undesired material formed in internal spaces of a gas turbine engine part from elevated temperature reactions between impurities in air passing through said internal spaces, said method comprising the steps of:

(a) immersing at least a portion of said part into a first tank containing water at a temperature and for a period of time sufficient to saturate at least a portion of said material;

(b) removing said part from said first tank and immersing said part into a second tank containing a cold liquid at a temperature and for a period of time sufficient to allow water from said immersion step (a) remaining in said material and on said part directly adjacent to said material to freeze thereby loosening at least some of said material from said part; and (c) removing said part from said second tank and flushing the internal spaces of said part with sufficient pressure to cause at least some of said material which the prior steps loosened from said part to be removed from said part.

2. A method for removing undesired material formed in internal spaces of a gas turbine engine part from elevated temperature reactions between impurities in air passing through said internal spaces, said method comprising the steps of:

(a) immersing at least a portion of said part into a first tank containing water at a temperature and for a period of time sufficient to saturate at least a portion of said material;

(b) removing said part from said first tank and immersing said part into a second tank containing a cold liquid at a temperature and for a period of time sufficient to allow water from said immersion step (a) remaining in said material and on said part directly adjacent to said material to freeze thereby loosening at least some of said material from said part;

(c) removing said part from said second tank and flushing the internal spaces of said part with sufficient pressure to cause at least some of said material which the prior steps loosened from said part to be removed from said part;

(d) taking said part after completion of step (c) and repeating steps (a) and (b) consecutively for at least one time;

(e) taking said part after completion of step (d) and repeating step (c); and (f) repeating steps (d) and (e) consecutively for a minimum number of times sufficient to remove said material from the internal spaces of said part.

3. The method according to claim 2, wherein the water in said first tank contains a surfactant capable of enhancing water absorption by said material.

4. The method according to claim 2, wherein step (a) further comprises sonicating said part while said part is immersed in said first tank, wherein said sonication enhances water absorption by said material.

5. The method according to claim 2, wherein the period of time of step (a) is at least approximately 10 minutes.

6. The method according to claim 2, wherein the temperature of the water in said first tank is between approximately 100° to 190° Fahrenheit.

7. The method according to claim 2, wherein the temperature of the cold liquid in said second tank is between approximately −320° to 20° Fahrenheit.

8. The method according to claim 7, wherein said cold liquid is liquid nitrogen, liquid carbon dioxide, liquid argon or liquid helium.

9. The method according to claim 8, wherein said period of time of step (b) is at least approximately 2 minutes.

10. The method according to claim 2, wherein said flushing of step (c) is performed with water.

11. The method according to claim 10, wherein said flushing of step (c) is a pulsating flush.

12. The method according to claim 11, wherein said pulsating flush is performed at least 3 times in one direction in the internal passage of said part and at least 3 times in the opposite direction.

13. The method according to claim 10, wherein said flushing is performed at a pressure of at least 500 psig.

14. The method according to claim 2, further comprising immersing said part in said first tank for at least 30 seconds prior to said flushing in step (c).

15. The method according to claim 2, further comprising the testing steps of:

(g) preparing said part for testing;

(h) performing a test on said part; and (i) examining the results of said test for the presence of said material in the internal spaces of said part.

16. The method according to claim 15, wherein said preparing step (g) comprises filling said part with a shot or a powder and said test of said performing step (h) comprises taking radiographic images of said part.

17. The method according to claim 16, wherein said powder is tungsten carbide cobalt powder.

18. The method according to claim 2, further comprising repeating step (d) for at least four times.

19. The method according to claim 18, further comprising repeating step (f) for two to four times.

20. The method according to claim 2, wherein said part is an air-cooled turbine engine blade.

* * * * *